US005852934A

United States Patent [19]

Chung et al.

[11] Patent Number: 5,852,934

[45] Date of Patent: Dec. 29, 1998

[54] FLUID JOINING DEVICE FOR POWER CONSTRUCTION VEHICLES

[75] Inventors: Tae Seung Chung, Pusan; Yeon Ho Kim, Changwon, both of Rep. of Korea

[73] Assignee: Samsung Heavy Industries Co., Ltd., Rep. of Korea

[21] Appl. No.: 762,968

[22] Filed: Dec. 10, 1996

[30] Foreign Application Priority Data

Mar. 30, 1996 [KR] Rep. of Korea .................... 1996-9635

[51] Int. Cl.[6] ...................................................... F16D 31/02

[52] U.S. Cl. ................................ 60/421; 60/429; 60/430; 91/461

[58] Field of Search ............................. 60/421, 426, 428, 60/429, 436; 91/461

[56] References Cited

U.S. PATENT DOCUMENTS

| | | | |
|---|---|---|---|
| 4,537,029 | 8/1985 | Gunda et al. | 60/429 X |
| 4,759,183 | 7/1988 | Kreth et al. . | |
| 4,875,337 | 10/1989 | Sugiyama et al. . | |
| 4,986,072 | 1/1991 | Kubomoto . | |
| 5,083,428 | 1/1992 | Kubomoto et al. | 60/421 |
| 5,148,676 | 9/1992 | Moriya et al. | 60/430 X |
| 5,485,724 | 1/1996 | Nozawa et al. . | |
| 5,692,377 | 12/1997 | Moriya et al. | 60/421 |

*Primary Examiner*—Hoang Nguyen
*Attorney, Agent, or Firm*—Harness, Dickey & Pierce, P.L.C.

[57] ABSTRACT

A fluid joining device for construction vehicles is disclosed. The device has a bypass line control valve which is mounted to a second center bypass line of the second pump. The bypass line control valve normally opens the second center bypass line but selectively closes the second center bypass line in response to a pilot pressure. A second pilot line control valve is mounted to a second pilot line and controls the second pilot line in response to an outside signal. The second pilot line extends from the first pilot line control valve and selectively drives the first pilot line control valve. The device selectively performs the fluid joining function in accordance with operational conditions of the actuators, thus smoothly operating the actuators and improving operational effect of the construction vehicle.

6 Claims, 6 Drawing Sheets

111
101
112
113
103
102
T
P1
114
110
100
115
10
P1
70
60
P3
40
30
32
31
P2
41
20
210
P2
500
200
520
510
215
50
214
P1(P3)
212
203
202
P2
213
T
211
201

FLUID JOINING DEVICE FOR POWER CONSTRUCTION VEHICLES

BACKGROUND OF THE INVENTION

1. Field of the Invention

The present invention relates, in general, to a fluid joining device for power construction vehicles such as power excavators and, more particularly, to a device for selectively joining pressurized fluid output from at least two main hydraulic pumps included in the hydraulic system of a construction vehicle together and supplying the joined fluid to one overloaded actuator.

2. Description of the Prior Art

As well known to those skilled in the art, the hydraulic system of a power construction vehicle such as a power excavator has at least two main hydraulic pumps in addition to a pilot pump. The main pumps individually output pressurized fluid which is used as actuating fluid for a plurality of motor and cylinder actuators, such as a travelling motor, a swing motor, a boom cylinder, an arm cylinder and a bucket cylinder of a power excavator. That is, the actuators of a power construction vehicle are divided into two groups which normally receive pressurized fluid output from the respective main pumps.

However, it may be necessary to join the pressurized fluid output from the two main pumps together and to supply the joined fluid to one actuator in accordance with operational conditions of the construction vehicle. For example, when either the boom cylinder or the arm cylinder is overloaded during an operation, it is necessary to supply a large amount of fluid to the overloaded actuator thereby smoothly moving the overloaded actuator at a desirable moving speed. In order to achieve the above object, the fluid from the two main pumps is selectively joined together and is supplied to the overloaded actuator.

FIG. 1 is a circuit diagram showing the hydraulic system of a construction vehicle provided with a typical fluid joining device. As shown in FIG. 1, first and second directional control valves 100 and 110 are connected to first and second actuators 101 and 111, such as boom and bucket cylinders of a power excavator, through a plurality of fluid lines 102, 103, 112 and 113 and control the flow rate and flow direction of pressurized fluid which is supplied from a first main pump 10 to the actuators 101 and 111. Meanwhile, third and fourth directional control valves 200 and 210 are connected to third and fourth actuators 201 and 211, such as arm cylinder and ACC of a power excavator, through a plurality of fluid lines 202, 203, 212 and 213 and control the flow rate and flow direction of pressurized fluid which is supplied from a second main pump 20 to the actuators 201 and 211.

The first main pump 10 is connected to the first and second directional control valves 100 and 110 through both a first center bypass line 114 and a first parallel line 115. Meanwhile, the second pump 20 is connected to the third and fourth directional control valves 200 and 210 through both a second center bypass line 214 and a second parallel line 215.

A bypass line control valve 50 is mounted to the second center bypass line 214 at a position behind the fourth directional control valve 210. The above line control valve 50 is biased by a valve spring on one end (spring-biased end), so that the valve 50 normally opens the second bypass line 214. However, when a pilot pressure P1 is applied to the other end (opposite end) of the valve 50, the valve 50 closes the second bypass line 214. The above pilot pressure P1 is also used as a spool drive pressure which is applied to the first directional control valve 100.

The first directional control valve 100 controls the flow rate and flow direction of pressurized fluid, which is supplied from the first pump 10 to the first actuator 101, in response to either pilot pressure P1, P2. The control valve 100 thus controls the operation of the actuator 101.

When the spool of the first control valve 100 is in a neutral position, the internal lines of the valve 100 except for the first bypass line 114 are closed, so that pressurized fluid output from the first pump 10 totally returns to a first return tank T.

When the pilot pressure P1 is applied to the first control valve 100, the spool of the valve 100 moves to the "A" position. The pressurized fluid from the first pump 10 is thus fed to the large chamber of the first actuator 101 through the line 102. In the above state, the fluid in the small chamber of the actuator 101 returns to the first return tank T through the line 103. In this case, the piston of the actuator 101 extends from the cylinder.

However, when the spool of the first control valve 100 moves to the "B" position, the fluid from the pump 10 is supplied to the small chamber of the actuator 101 through the line 103, while the fluid in the large chamber of the actuator 101 returns to the return tank T through the line 102. The piston of the actuator 101 in the above state retracts into the cylinder.

In order to selectively join the pressurized fluid from the two pumps 10 and 20 together and to supply the joined fluid to an overloaded actuator, a first confluent line 32 is branched from the center bypass line 114 of the first pump 10 at a position before the first directional control valve 100. Meanwhile, a second confluent line 31 is branched from the parallel line 215 of the second pump 20. The two confluent lines 31 and 32 are coupled together through a spring-biased logic valve 30. The logic valve 30 is normally closes the confluent lines 31 and 32 due to a pilot pressure. However, when the pilot pressure is removed from the logic valve 30, the valve 30 opens the confluent lines 31 and 32 due to the biasing force of a valve spring included in the valve 30, thus joining the pressurized fluid from the two pumps 10 and 20 together. In the above state, the logic valve 30 only allows pressurized fluid to flow from the second confluent line 31 to the first confluent line 32, so that the flow direction of fluid in the joining device is limited to the direction from the second pump 20 to the first pump 10.

In order to control the logic valve 30, a first pilot line 41 is branched from the second confluent line 31. A first pilot line control valve 40 is mounted to the pilot line 41. The pilot line control valve 40 is biased by a valve spring, so that the valve 40 normally opens the pilot line 41. However, when the pilot pressure P1 is applied to the valve 40, the valve 40 closes the first pilot line 41 thus joining the fluid from the two pumps 10 and 20 together.

When the spool of the first directional control valve 100 moves to the "A" position in order to move up the piston of the first actuator 101, the pilot pressure P1 for the valve 100 is applied to the bypass line control valve 50, thus closing the second bypass line 214. In the above state, pressurized fluid from the second pump 20 cannot return to the second return tank T. The pilot pressure P1 is also simultaneously applied to the first pilot line control valve 40, thus closing the first pilot line 41. Therefore, the logic valve 40 opens the confluent lines 31 and 32 while overcoming the biasing force of the valve spring included in the logic valve 40. The pressurized fluid from the second pump 20 thus passes through the second parallel line 215, second confluent line 31, logic valve 30 and first confluent line 32 and reaches the first bypass line 114 of the first directional control valve 100. In the first bypass line 114, the fluid from the second pump 20 and the fluid from the first pump 10 are joined together. The joined fluid is, thereafter, fed to the large chamber of the overloaded actuator 101 through the line 102, thus smoothly moving the piston of the actuator 101 at a desirable moving speed.

However, the above fluid joining device is problematic in that fluid from the first and second pumps 10 and 20 may be joined together at any time regardless of the operation of the actuators 210 and 211 connected to the second pump 20, so that the fluid from the second pump 20 may be unnecessarily or undesirably joined to the fluid from the first pump 10 when two actuators, which are connected to the two pumps 10 and 20 respectively, are operated at the same time. For example, when the actuators 101 and 201 are simultaneously operated by pressurized fluid from the pumps 10 and 20, it is necessary to prevent the output fluid of the two pumps 10 and 20 from being joined together. However, when the actuating pressure of the third actuator 201 in the above state is higher than that of the first actuator 101, the fluid from the second pump 20 is undesirably joined to the fluid from the first pump 10 in the fluid line 102 of the first control valve 100. Therefore, the third actuator 201 is brought into a shortage of actuating fluid, so that the actuator 201 fails to smoothly move. In order to overcome the above problems, it is necessary to selectively halt the fluid joining function during a synchronous operation of actuators, one of which has a pressure of higher than the pressure of the fluid joining circuit. However, the typical fluid joining device may unnecessarily or undesirably join the fluid from the two pumps together without regarding the operational conditions of the synchronously-operated actuators.

SUMMARY OF THE INVENTION

It is, therefore, an object to provide a fluid joining device for power construction vehicles in which the above problems can be overcome and which selectively joins fluid from pumps together in response to an outside signal, thereby smoothly operating the actuators of a construction vehicle during a synchronous operation of the actuators.

In order to accomplish the above object, the present invention provides a fluid joining device for power construction vehicles, comprising a first main pump connected to one or more first directional control valves in parallel and supplying pressurized fluid to one or more first actuators through the first directional control valves, a second main pump connected to one or more second directional control valves in parallel and supplying pressurized fluid to one or more second actuators through the second directional control valves, a first confluent line extending from a first center bypass line of the first pump, a second confluent line extending from a parallel line of the second pump, a logic valve connecting the first and second confluent lines together and normally closing the confluent lines but selectively opening the confluent lines in response to a pilot pressure, a first pilot line extending from the second confluent line at a position before the logic valve and selectively applying the pilot pressure to the logic valve, and a first pilot line control valve mounted to the first pilot line and normally opening the first pilot line but selectively closing the pilot line in response to a pilot pressure thereby selectively intercepting the pilot pressure supplied to the logic valve, further comprising: a bypass line control valve mounted to a second center bypass line of the second pump at a position where the second bypass line completely passes through the second directional control valves, the bypass line control valve normally opening the second center bypass line but selectively closing the second center bypass line in response to a pilot pressure; and a second pilot line control valve mounted to a second pilot line and controlling the second pilot line in response to an outside signal, the second pilot line extending from the first pilot line control valve and selectively driving the first pilot line control valve.

In accordance with an embodiment. the second pilot line control valve is a solenoid valve which is movable between a pilot fluid supply position, where the solenoid valve is operated by an electric signal and thereby supplies pilot fluid to the second pilot line, and a pilot fluid return position where the solenoid valve returns the pilot fluid of the second pilot line to a return tank.

In accordance with another embodiment, the pilot pressure acting on the bypass line control valve is identified with the pilot pressure applied to the first pilot line control valve.

In accordance with a further embodiment, the outside signal acting on the second pilot line control valve is identified with a pilot pressure used for driving a spool of a second directional control valve.

In accordance with still another embodiment, the outside signal acting on the second pilot line control valve is generated from an actuating pressure, the actuating pressure being output from a first directional control valve and being used for actuating an associated first actuator.

In accordance with still another embodiment, a pressure switch is mounted to either a pilot pressure line supplying a pilot pressure used for driving a spool of a second directional control valve or an actuating pressure line supplying an actuating pressure from the second directional control valve to an associated second actuator. The pressure switch senses the pressure inside either the pilot pressure line or the actuating pressure line and outputs the electric signal to the solenoid valve thereby operating the solenoid valve.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 2:
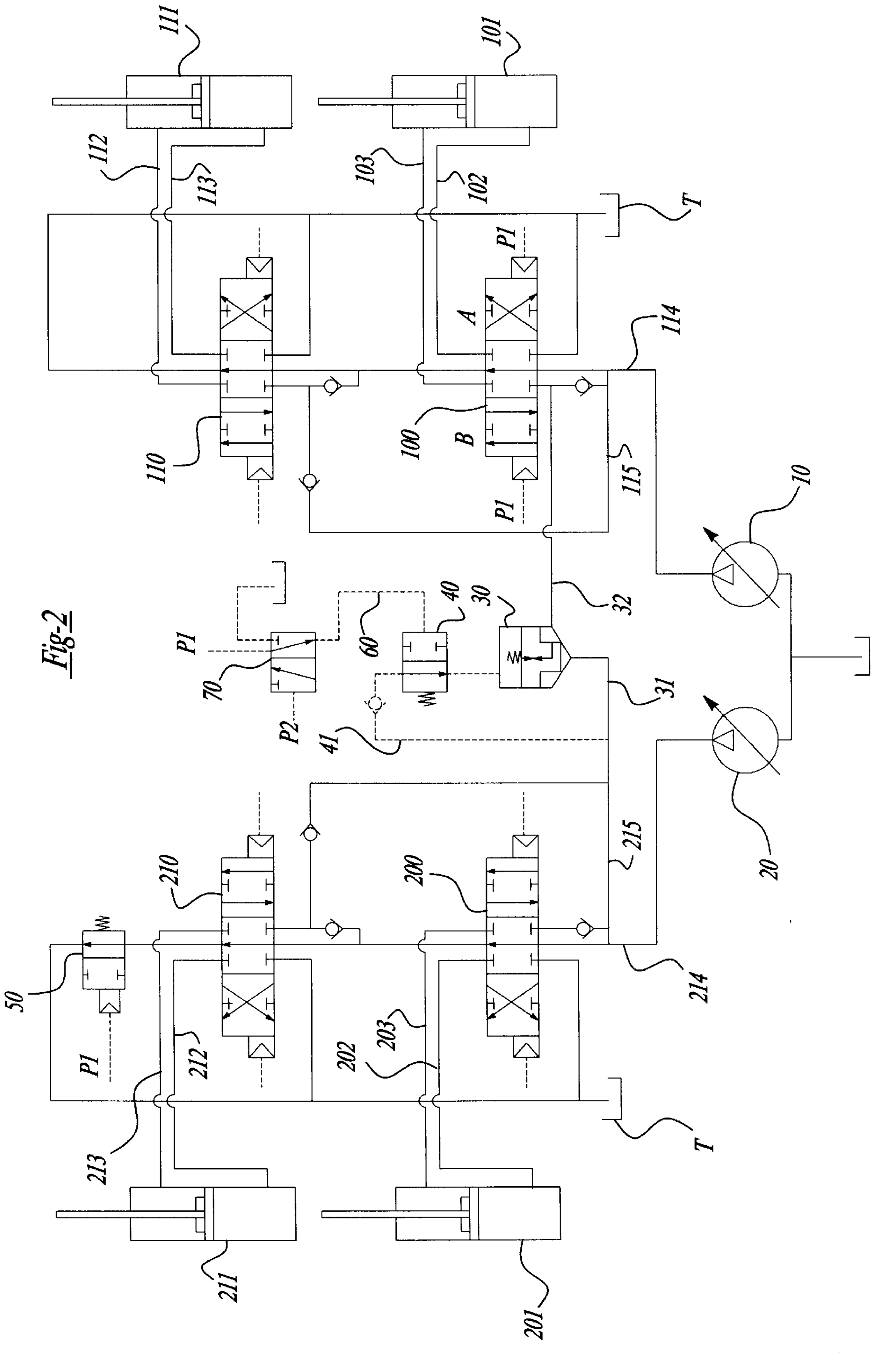
FIG. 2 is a circuit diagram showing the hydraulic system of a construction vehicle provided with a fluid joining device in accordance with the primary embodiment of the present invention.

FIG. 2 is a circuit diagram showing the hydraulic system of a construction vehicle provided with a fluid joining device in accordance with the primary embodiment of the present invention.

Figure 1:
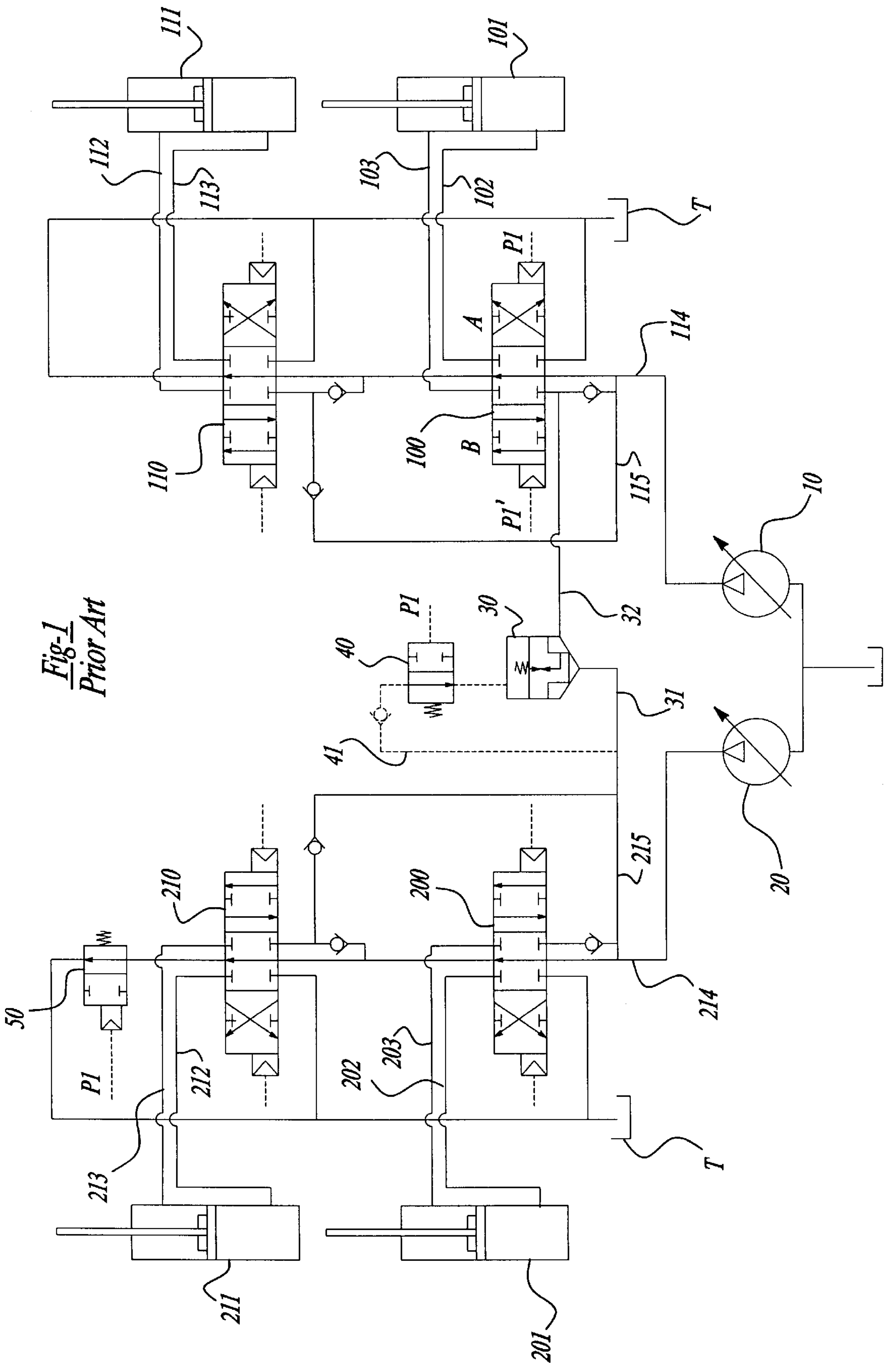
Fig-1 Prior Art
FIG. 1 is a circuit diagram showing the hydraulic system of a construction vehicle provided with a typical fluid joining device.

As shown in FIG. 1, first and second directional control valves 100 and 110 are connected to first and second actuators 101 and 111, such as boom and bucket cylinders of a power excavator, through a plurality of fluid lines 102, 103, 112 and 113 and control the flow rate and flow direction of pressurized fluid which is supplied from a first main pump 10 to the actuators 101 and 111. Meanwhile, third and fourth directional control valves 200 and 210 are connected to third and fourth actuators 201 and 211, such as arm cylinder and ACC of a power excavator, through a plurality of fluid lines 202, 203, 212 and 213 and control the flow rate and flow direction of pressurized fluid which is supplied from a second main pump 20 to the actuators 201 and 211.

The first main pump 10 is connected to the first and second directional control valves 100 and 110 through both a first center bypass line 114 and a first parallel line 115. Meanwhile, the second pump 20 is connected to the third and fourth directional control valves 200 and 210 through both a second center bypass line 214 and a second parallel line 215.

A first confluent line 32 is branched from the center bypass line 114 of the first pump 10 at a position before the first directional control valve 100. A second confluent line 31 is branched from the parallel line 215 of the second pump 20. The two confluent lines 31 and 32 are coupled together through a spring-biased logic valve 30. The logic valve 30 normally closes the confluent lines 31 and 32. However, when a pilot pressure is applied to the logic valve 30, the valve 30 opens the confluent lines 31 and 32. A first pilot line 41 is branched from the second confluent line 31 at a position before the logic valve 30 and selectively supplies the pilot pressure to the logic valve 30. A first pilot line control valve 40 is mounted to the pilot line 41. The pilot line control valve 40 is biased by a valve spring, so that the valve 40 normally opens the pilot line 41. However, when a pilot pressure is applied to the valve 40, the valve 40 closes the first pilot line 41 thus applying the pilot pressure to the logic valve 30.

A bypass line control valve 50 is mounted to the second center bypass line 214 at a position behind the fourth directional control valve 210. The above line control valve 50 is biased by a valve spring on one end (spring-biased end), so that the valve 50 normally opens the second bypass line 214. However, when a first pilot pressure P1 is applied to the other end (opposite end) of the valve 50, the valve 50 closes the second bypass line 214. A second pilot line 60 extends from the first pilot line control valve 40 and selectively applies a pilot pressure to the valve 40. A second pilot line control valve 70 is mounted to the second pilot line 60 and controls the second pilot line 60 in response to an outside pilot pressure or second pilot pressure P2.

In the above fluid joining device, the first pilot pressure P1 is also used as a spool drive pressure which is applied to the first directional control valve 100. The outside pilot pressure P2 is controllably input by an operator through a switching member. That is, the application of the pressure P1 means that the first actuator 101 is in an operation, while the application of the pressure P2 means that the switching member is turned on by the operator.

The operational effect of the above fluid joining device will be described hereinbelow.

In the operation of the device, the pilot pressures P1 and P2 may be simultaneously or selectively applied to the valves as follows.

1. A synchronous operation of actuators, with the first actuator 101 being operated and thereby applying the first pilot pressure P1 to the fluid joining device and either of the third or fourth actuators 201 and 211 being operated:

When the pilot pressure P2 is not applied to the second pilot line control valve 70 and the actuating pressure of the actuator 201 or 211 is higher than that of the actuator 101, the fluid from the second pump 20 is joined to the fluid from the first pump 10 through the fluid joining device of this invention. The joined fluid in turn is supplied to the first actuator 101 thereby smoothly moving the actuator 101 at a desirable moving speed.

That is, due to the first pilot pressure P1, the bypass line control valve 50 closes the second bypass line 214. In addition, since the second pilot line control valve 70 is free from the outside pilot pressure P2, the valve 70 continuously opens the second pilot line 60 thereby applying the first pilot pressure P1 to the first pilot line control valve 40.

Thus, the pilot line control valve 40 closes the first pilot line 41 and thereby opens the logic valve 30. The logic valve 30 in the above state allows the fluid of the second bypass line 214 to be fed to the first bypass line 114 through the confluent lines 31 and 32. The joined fluid in turn is fed to the first actuator 101.

If briefly described, in the case of a synchronous operation with the first pressure P1 exclusively, the fluid from the second pump 20 is effectively joined to the fluid from the first pump 10 when the actuating pressure of an actuator 201 or 211 connected with the second pump 20 is higher than that of an actuator 101, 111 connected to the first pump 10.

2. An operation, with the first and second pilot pressures P1 and P2 being commonly applied to the fluid joining device:

When the outside pilot pressure P2 is applied to the second pilot line control valve 70, the valve 70 closes the second pilot line 60. Therefore, the first pilot line control valve 40 opens the first pilot line 41 due to the biasing force of the valve spring included in the valve 40. The logic valve 30 in the above state closes the confluent lines 31 and 32, so that the fluid from the second pump 20 is not joined to the fluid from the first pump 10. Therefore, even if the actuating pressure of an actuator 201 or 211 connected to the second pump 20 is higher than that of an actuator 101, 111 connected to the first pump 10, the fluid from the two pumps 10 and 20 is not joined together.

Therefore, the actuator 201 or 211 connected to the second pump 20 can be smoothly operated regardless of the operation of the actuator 101 or 111 connected to the first pump 10.

FIGS. 3 to 6 are circuit diagrams showing the hydraulic systems provided with fluid joining devices in accordance with other embodiments of the present invention, respectively. In the embodiments of FIGS. 3 to 6, the pilot pressure supplying means, second pilot line control valve and outside pilot pressure supplying means for the second pilot line control valve are alternated.

Figure 3:
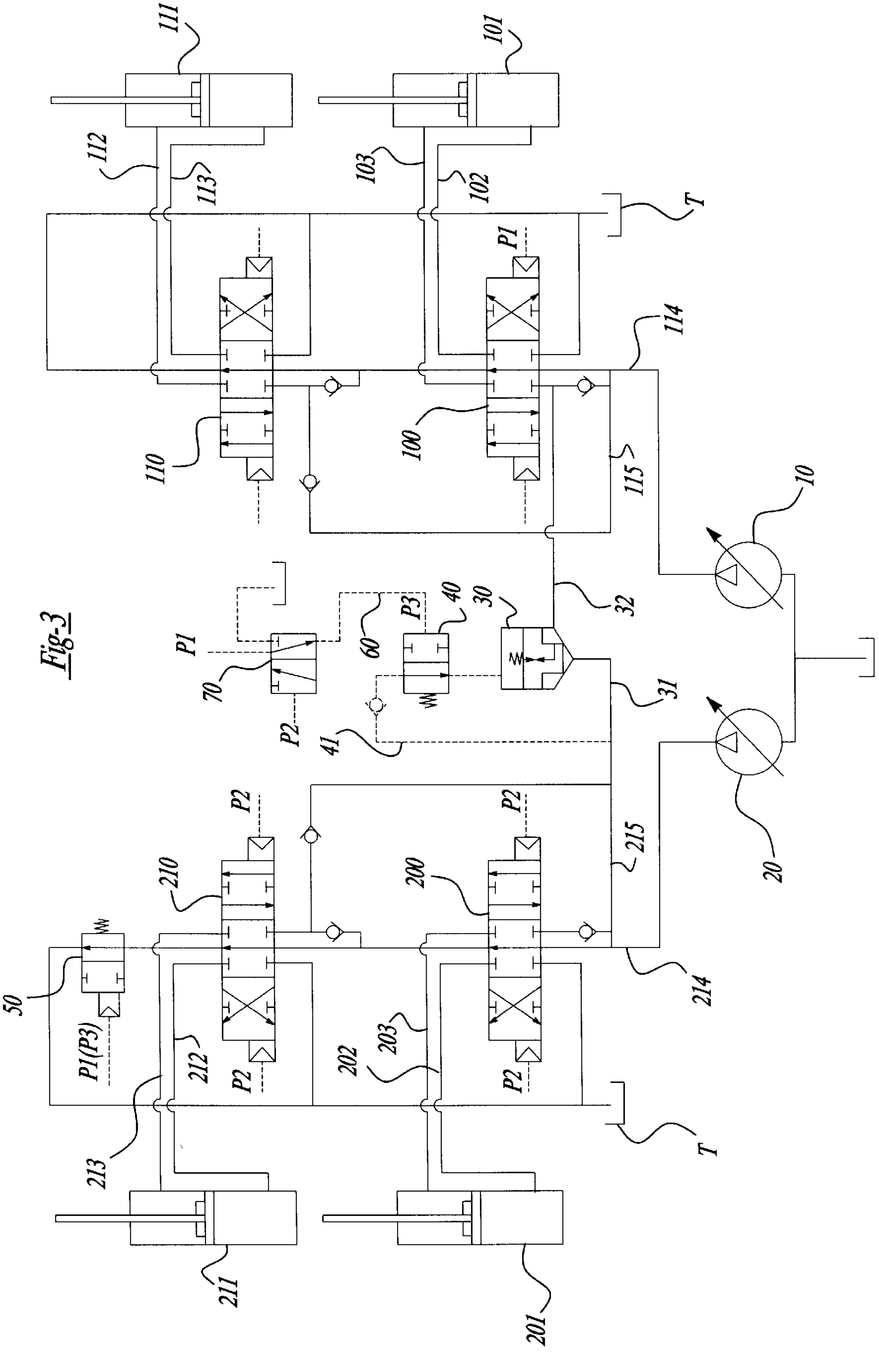
FIGS. 3 to 6 are circuit diagrams showing the hydraulic systems provided with fluid joining devices in accordance with other embodiments of the present invention, respectively.

FIG. 3 shows the fluid joining device according to the second embodiment of this invention. In the second embodiment, most of the elements are common with the primary embodiment, so that those elements common to both the primary embodiment and the second embodiment will carry the same reference numerals and further explanation is thus not deemed necessary.

In the second embodiment, the second pilot line control valve 70 is biased by the valve spring, so that the valve 70 normally opens the second pilot line 60. However, when the second pilot pressure P2 is applied to the second pilot line control valve 70, the valve 70 closes the second pilot line 60.

In addition, when the first pilot pressure P1 is applied to the bypass line control valve 50, the valve 50 closes the normally-opened center bypass line 214.

In this second embodiment, a third pilot pressure P3 may be preferably used in place of the first pilot pressure P1 for the bypass line control valve 50. In this case, when at least one of the actuators 201 and 211 connected to the second pump 20 is operated, the second pilot line control valve 70 closes the second pilot line 60 in response to the second pilot pressure P2. The bypass line control valve 50 in the above state is free from the third pilot pressure P3, so that the valve 50 opens the center bypass line 214 extending from the second pump 20.

In the above fluid joining device, the first pilot pressure P1 is also used as a spool drive pressure which is applied to the first directional control valve 100. The third pilot pressure P3 is generated by the first pilot pressure P1, which passes through the second pilot line control valve 70 prior to being applied to the first pilot line control valve 40. Meanwhile, the second pilot pressure P2 is also used as a spool drive pressure which is applied to the third or fourth directional control valves 200, 210. That is, the application of the first pilot pressure P1 means that the first actuator 101 is in an operation, while the application of the pressure P3 means that the second pilot line control valve 70 is opened. The application of the second pilot pressure P2 means that the third or fourth actuator 201, 211 is in an operation.

The operational effect of the fluid joining device according to the second embodiment will be described hereinbelow.

When the first actuator 101 and either of the third or fourth actuators 201 and 211 are operated at the same time, the first and second pilot pressures P1 and P2 are commonly applied to the fluid joining device.

Since the second pilot pressure P2 is applied to the second pilot line control valve 70, the valve 70 closes the second pilot line 60. Therefore, the first pilot line control valve 40 opens the first pilot line 41 due to the biasing force of the valve spring included in the valve 40. The logic valve 30 in the above state closes the confluent lines 31 and 32, so that the fluid from the second pump 20 is not joined to the fluid from the first pump 10. Therefore, even if the actuating pressure of an actuator 201 or 211 connected to the second pump 20 is higher than that of the actuator 101 connected to the first pump 10, the fluid from the two pumps 10 and 20 is not joined together.

Figure 4:
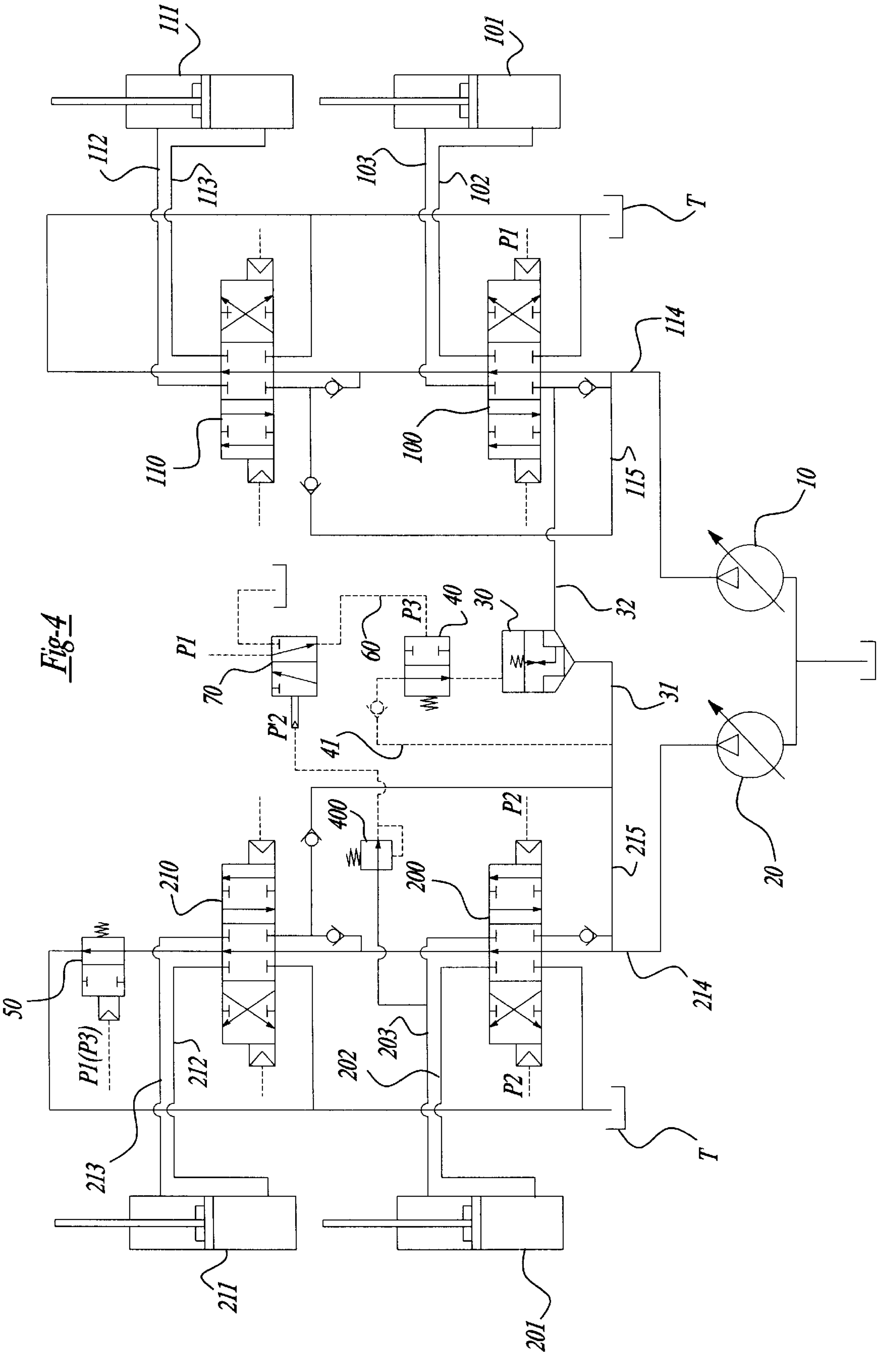

In accordance with the third embodiment, a pilot pressure P2' may be used in place of the pilot pressure P2 which is applied to the second pilot line control valve 70 as shown in FIG. 4. The pressure P2' is branched from the fluid line 203, extending between the third actuator 201 and the third control valve 200, and passes through a pressure reduction valve 400 prior to being applied to the valve 70. Alternatively, the pressure P2' may be branched from another line, such as the line 202, 212, 213. As a further Alternative, the pressure P2' may be branched from all of the lines 202, 203, 212 and 213 in parallel.

The operation of the second pilot line control valve 70 in response to the pressure P2' remains the same as that described for the second embodiment and further explanation is thus not deemed necessary.

Figure 5:
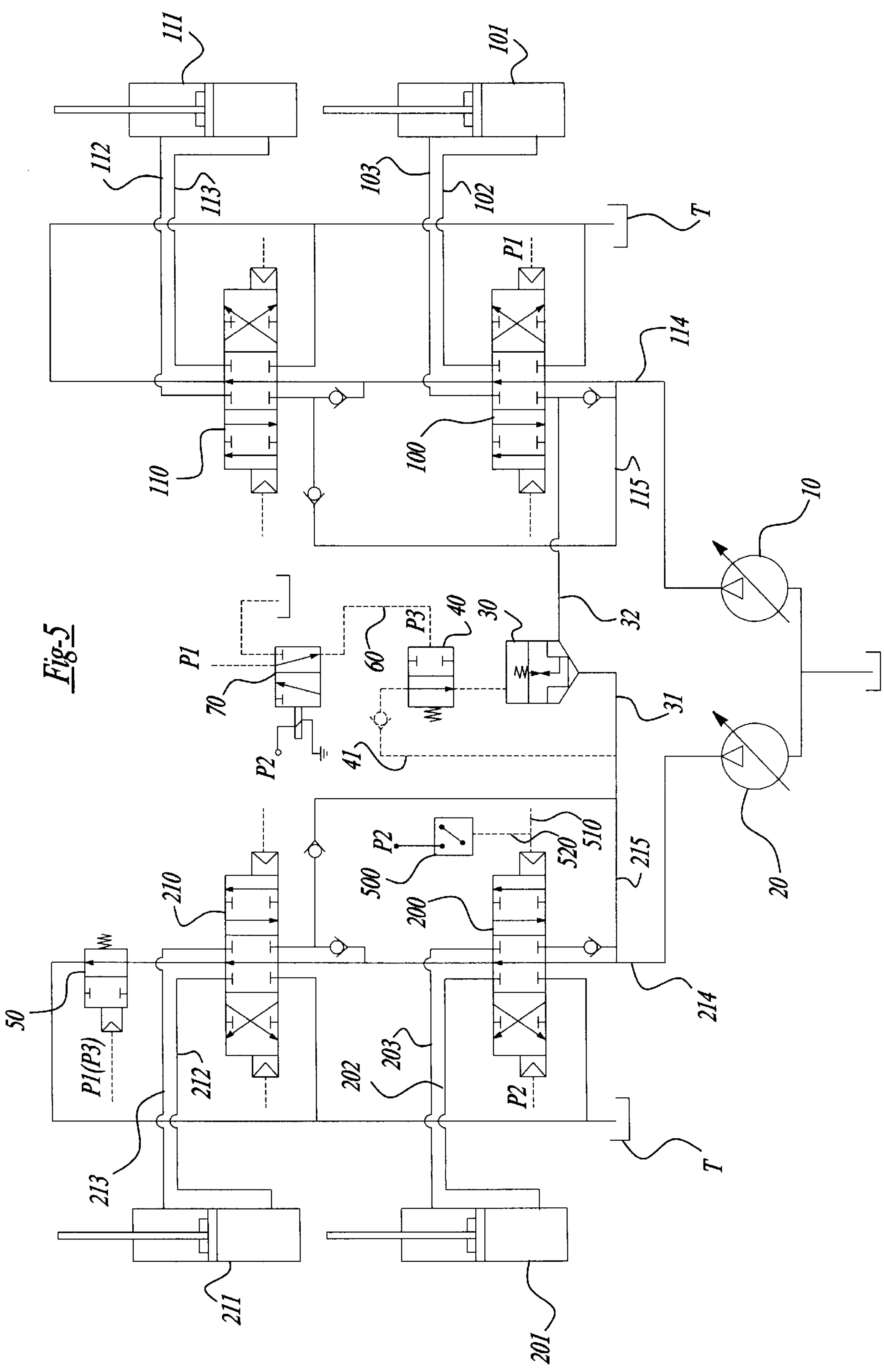

FIG. 5 shows the fluid joining device according to the fourth embodiment of this invention. In the fourth embodiment, most of the elements are common with the second embodiment, so that those elements common to both the second embodiment and the fourth embodiments will carry the same reference numerals and further explanation is thus not deemed necessary.

In the fourth embodiment, the second pilot line control valve 70 is a solenoid valve which moves between a pilot fluid supply position and a pilot fluid return position. The valve 70 in the pilot fluid supply position is operated by an electric signal P2 and applies the pilot pressure P1 or P3 to the second pilot line 60. Meanwhile, the valve 70 in the pilot fluid return position returns the pilot fluid of the second pilot line 60 to a return tank.

Figure 6:
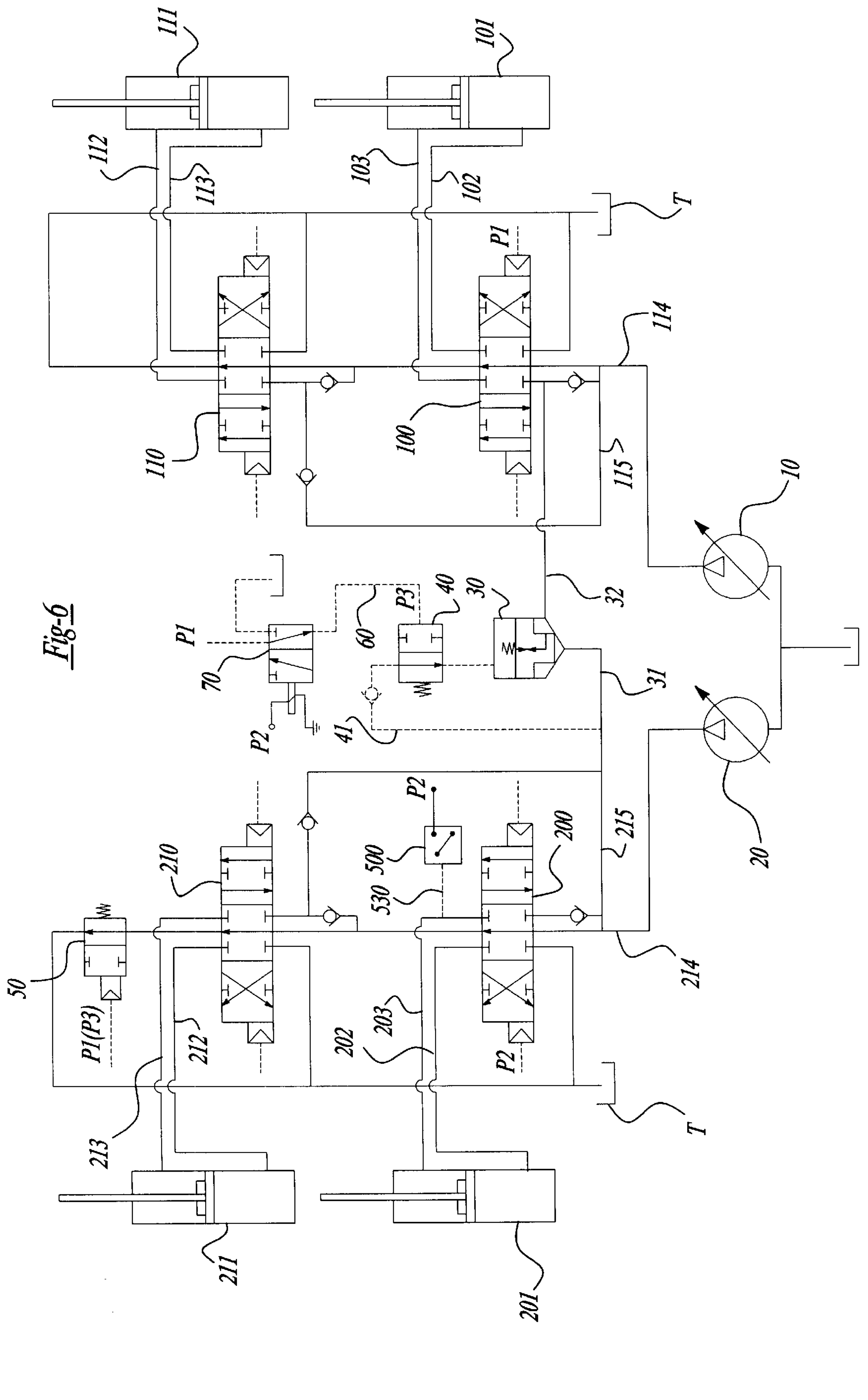

The fluid joining device of the fourth embodiment also includes a pressure switch 500 which is mounted to a branch line 520. The line 520 is branched from a pilot pressure line 510 which supplies a pilot pressure used for driving the spool of the third control valve 200 connected to the second pump 20. When the pilot pressure is applied to the third control valve 200, the pressure switch 500 senses the pressure inside the line 520 and outputs an electric signal P2 to the solenoid valve 70 thereby operating the valve 70. In accordance with another embodiment of this invention, the above pressure switch 500 may be mounted to a line 530 which is branched from the line 203 extending between the third control valve 200 and the third actuator 201 as shown in FIG. 6.

In the fluid joining device according to the fourth embodiment, the pilot pressure P1 is also used as a spool drive pressure which is applied to the first directional control valve 100. The pilot pressure P3 is generated by the pilot pressure P1, which passes through the second pilot line control valve 70 prior to being applied to the first pilot line control valve 40. Meanwhile, the electric signal P2 is converted from a pilot pressure, which is used for operating spool of the third control valve 200 and is sensed by the pressure switch 500. That is, the application of the pilot pressure P1 means that the first actuator 101 is in an operation, while the application of the pressure P3 means that the second pilot line control valve 70 is opened. The application of the electric signal P2 means that the third or fourth actuator 201, 211 is operated by the third or fourth control valve 200, 210.

The operational effect of the fluid joining device according to the fourth embodiment will be described hereinbelow.

When the first actuator 101 and either of the third or fourth actuators 201 and 211 are operated at the same time, the pilot pressures P1 and electric signal P2 are commonly applied to the fluid joining device.

Since the electric signal P2 is applied to the second pilot line control valve or solenoid valve 70, the valve 70 closes the second pilot line 60. Therefore, the first pilot line control valve 40 opens the first pilot line 41 due to the biasing force of the valve spring included in the valve 40. The logic valve 30 in the above state closes the confluent lines 31 and 32, so that the fluid from the second pump 20 is not joined to the fluid from the first pump 10. Therefore, even if the actuating pressure of an actuator 201 or 211 connected to the second pump 20 is higher than that of the actuator 101 connected to the first pump 10, the fluid from the two pumps 10 and 20 is not joined together.

As described above, the present invention provides a fluid joining device for construction vehicles. The device has a second pilot line control valve which controls a second pilot line in response to an outside signal. Therefore, the device selectively performs the fluid joining function in accordance with operational conditions of the actuators connected to the second pump, thereby smoothly operating the actuators of a construction vehicle and improving operational effect of the construction vehicle during a synchronous operation of the actuators.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fluid joining device for power construction vehicles, comprising a first main pump connected to one or more first directional control valves in parallel and supplying pressurized fluid to one or more first actuators through the first directional control valves, a second main pump connected to one or more second directional control valves in parallel and supplying pressurized fluid to one or more second actuators through the second directional control valves, a first confluent line extending from a first center bypass line of the first pump, a second confluent line extending from a parallel line of the second pump, a logic valve connecting the first and second confluent lines together and normally closing the confluent lines but selectively opening the confluent lines in response to a pilot pressure, a first pilot line extending from the second confluent line at a position before the logic valve and selectively applying the pilot pressure to the logic valve, and a first pilot line control valve mounted to the first pilot line and normally opening the first pilot line but selectively closing the pilot line in response to a pilot pressure thereby selectively intercepting the pilot pressure supplied to the logic valve, further comprising:

a bypass line control valve mounted to a second center bypass line of said second pump at a position where the second bypass line completely passes through the second directional control valves, said bypass line control valve normally opening the second center bypass line but selectively closing the second center bypass line in response to a pilot pressure; and a second pilot line control valve mounted to a second pilot line and controlling said second pilot line in response to an outside signal, said second pilot line extending from the first pilot line control valve and selectively driving the first pilot line control valve.

2. The fluid joining device according to claim 1, wherein said second pilot line control valve is a solenoid valve being movable between a pilot fluid supply position, where said solenoid valve is operated by an electric signal and thereby supplies pilot fluid to said second pilot line, and a pilot fluid return position where said solenoid valve returns the pilot fluid of said second pilot line to a return tank.

3. The fluid joining device according to claim 1, wherein said pilot pressure acting on said bypass line control valve is identified with the pilot pressure applied to said first pilot line control valve.

4. The fluid joining device according to claim 1, wherein said outside signal acting on said second pilot line control valve is identified with a pilot pressure used for driving a spool of a second directional control valve.

5. The fluid joining device according to claim 1, wherein said outside signal acting on said second pilot line control valve is generated from an actuating pressure, said actuating pressure being output from a first directional control valve and being used for actuating an associated first actuator.

6. The fluid joining device according to claim 2, further comprising:

a pressure switch mounted to either a pilot pressure line supplying a pilot pressure used for driving a spool of a second directional control valve or an actuating pressure line supplying an actuating pressure from said second directional control valve to an associated second actuator, said pressure switch sensing the pressure inside either the pilot pressure line or the actuating pressure line and outputting the electric signal to said solenoid valve thereby operating the solenoid valve.

* * * * *